UNITED STATES PATENT OFFICE.

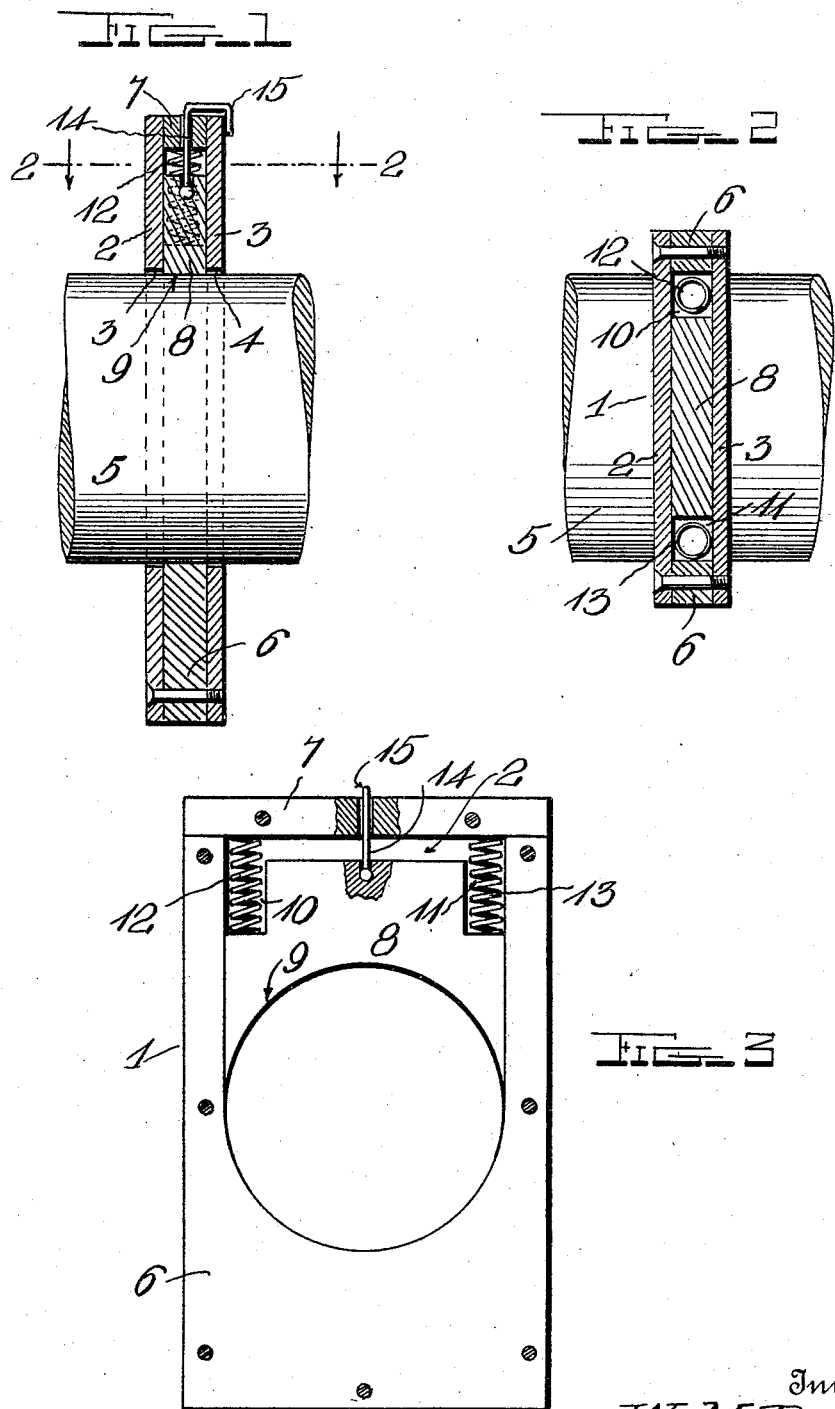

WILBER N. BAILEY, OF PULLMAN, ILLINOIS.

DUST-GUARD.

No. 929,373.　　　Specification of Letters Patent.　　　Patented July 27, 1909.

Application filed April 15, 1909. Serial No. 490,178.

*To all whom it may concern:*

Be it known that I, WILBER N. BAILEY, a citizen of the United States, residing at Pullman, in the county of Cook and State of Illinois, have invented certain new and useful Improvements in Dust-Guards; and I do declare the following to be a full, clear, and exact description of the invention, such as will enable others skilled in the art to which it appertains to make and use the same.

This invention relates to an improved dust guard for axles, and it has for its object the production of a device of this character which will prevent the passage of dust between it and the axle to which it is applied.

With the foregoing and other objects in view, the invention consists of certain novel features of construction, combination and arrangement of parts, as will be more fully described and particularly pointed out in the appended claim.

In the accompanying drawings, Figure 1 is a longitudinal section of this improved dust guard, showing one end of the shaft or axle in connection therewith; Fig. 2 is a transverse section taken on the line 2—2 of Fig. 1; Fig. 3 is a front elevation of this improved dust guard with one of the plates removed.

In the embodiment illustrated, this dust guard 1 which may be used as a journal bearing, if desired, is preferably composed of two outer plates 2 and 3 having registering apertures, as 4, therein for the passage of the axle 5. Arranged between these plates 2 and 3 and fixedly secured thereto is an approximately U-shaped spacing member 6, the lower curved portion of which is arranged to conform to the shape of the lower portion of the opening in the plates. A cross bar 7 spans the space between the free ends of the legs of the member 6, at the upper end thereof, and is preferably arranged flush with the outer ends of the plates 2 and 3.

Arranged within the space between the plates 2 and 3 and the legs of the member 6 is a sliding plate 8 which has a curved bearing surface 9, at its lower end, to engage the axle 5. This curved surface 9 is adapted to closely fit and correspond in configuration with the cross section of the axle 5 to prevent the separation of said parts and resulting crevices where dust may enter and oil escape.

This plate 8 is provided at its upper opposite corners with recesses 10 and 11, opening outwardly and which are adapted to receive coiled springs 12 and 13 which bear at one end against the inner faces of the recesses and at their other end against the cross bar 7 and are adapted to hold said plate yieldingly in contact with the shaft or axle 5. The side plates 2 and 3 and the legs of the member 6 inclose the springs 12 and 13 and prevent dust, dirt and other material from reaching them.

A hook-like member 14 is secured at one end to the upper end of the plate 8 and extends through an aperture in the cross bar 7 and is provided at its free end with an approximately inverted U-shaped hook 15, for a purpose to be described. This member 14 has a swiveled connection with the plate 8 and is adapted to be freely rotated therein and in the aperture in the cross bar through which it passes. When it is desired to move the dust guard on the axle 5, this hook member 14 is drawn upwardly to raise the plate 8 against the tension of the springs 12 and 13, until the free end of the hook 15 clears the upper edge of the cross bar 7, when the hook is turned to bring said free end into engagement with the upper face of the cross bar, thereby holding the plate 8 in raised position and permitting the guard to be moved into any desired position on the shaft. After the guard has been adjusted to the desired position, the hook 15 is again turned to permit its free end to extend over the side of the cross bar and the outer edge of the plate 2 or 3, as the case may be, thereby permitting the plate 8 to be moved by the springs 12 and 13 into close engagement with the shaft 5.

Various changes in the form, proportion and the minor details of construction, may be resorted to without departing from the principle or sacrificing any of the advantages of the invention, as defined in the appended claim.

What I claim is:

In a dust guard, the combination of a casing, a vertically movable spring pressed member arranged within said casing, an operating pin swiveled to said movable member and extending through the upper wall of said casing and provided at its outer end with a down turned hook adapted to fit over the edge of the casing when said spring pressed member is in operative position and with the free end thereof adapted to engage the upper face of the edge of the casing to hold said member in elevated inoperative position.

In testimony whereof I have hereunto set my hand in presence of two subscribing witnesses.

WILBER N. BAILEY.

Witnesses:
CHARLES M. MEIER,
MARK BIGELOW.